United States Patent
Tagscherer

(10) Patent No.: US 8,255,699 B2
(45) Date of Patent: Aug. 28, 2012

(54) PORTABLE DATA STORAGE MEDIUM FOR BIOMETRIC USER IDENTIFICATION

(75) Inventor: Michael Tagscherer, Gauting (DE)

(73) Assignee: Giesecke & Devrient GmbH, Munich (DE)

( * ) Notice: Subject to any disclaimer, the term of this patent is extended or adjusted under 35 U.S.C. 154(b) by 534 days.

(21) Appl. No.: 12/518,264

(22) PCT Filed: Dec. 6, 2007

(86) PCT No.: PCT/EP2007/010618
§ 371 (c)(1),
(2), (4) Date: Jun. 8, 2009

(87) PCT Pub. No.: WO2008/068022
PCT Pub. Date: Jun. 12, 2008

(65) Prior Publication Data
US 2010/0054547 A1   Mar. 4, 2010

(30) Foreign Application Priority Data

Dec. 8, 2006  (DE) .......................... 10 2006 057 948

(51) Int. Cl.
*G06F 21/00* (2006.01)
(52) U.S. Cl. ....................................... 713/186; 382/115
(58) Field of Classification Search .................. 726/1–4, 726/16–19, 26–28; 713/186; 382/115–127
See application file for complete search history.

(56) References Cited

U.S. PATENT DOCUMENTS

| | | | |
|---|---|---|---|
| 4,724,542 A | 2/1988 | Williford | |
| 5,850,470 A | 12/1998 | Kung | |
| 6,185,337 B1 | 2/2001 | Tsujino | |
| 2002/0136433 A1 | 9/2002 | Lin | |
| 2007/0110283 A1* | 5/2007 | Hillhouse et al. | 382/115 |

FOREIGN PATENT DOCUMENTS

DE   19634769 A1   3/1997
(Continued)

OTHER PUBLICATIONS

Tagscherer M. et al., "Kontinuierliches Lernen mit Neuronalen Netzen", Proc. 9. Workshop Fuzzy Systeme, VDI/VDE GMA, Fachausschuss 5.14 Computational Intelligence, 1999, Seiten 1-14, XP002474110.
Bechelli L. et al., "Biometrics authentication with smartcard", Technical Report Istituto Di Informatica E Telematica, Nr. Aug. 2002, Mar. 2002, Seiten 1-12, XP002270622.
Chen S. et al, "Recognizing Partially Occluded, Expression Variant Faces From Single Training Image per Person with SOM and Soft kNN Ensemble", IEEE Transactions on Neural Networks, IEEE Service Center, Piscataway, NJ, US, vol. 16, No. 4, Jul. 2005, Seiten 875-886, XP011135667, ISSN: 1045-9227.

(Continued)

*Primary Examiner* — Gilberto Barron, Jr.
*Assistant Examiner* — Malcolm Cribbs
(74) *Attorney, Agent, or Firm* — Bacon & Thomas, PLLC

(57) ABSTRACT

A portable data carrier (1) comprises an executable training module (8) which provides in a memory (4, 5) of the data carrier (1) a reference model (10; M) for the biometric recognition of a user of the data carrier (1) by a recognition module (9), whereby a biometric comparison vector (16) which lies within the acceptance range (A) of the reference model (10; M) is accepted by the recognition module (9) as coming from the user. In so doing, the training module (8) defines the reference model (10; M) by model nodes (P, P0-P4) which are formed from biometric reference vectors (17; N) in each case coming from the user, whereby a new model node (P, P0-P4) is added to the reference model (10; M) when the associated reference vector (17; N) lies outside the acceptance range (A) of the reference model (10; M).

14 Claims, 4 Drawing Sheets

FOREIGN PATENT DOCUMENTS

| | | |
|---|---|---|
| DE | 102004043875 A1 | 3/2006 |
| EP | 0849699 A2 | 6/1996 |
| WO | 9108555 A1 | 6/1991 |
| WO | 02071314 A1 | 9/2002 |
| WO | 2006069158 A2 | 6/2006 |

OTHER PUBLICATIONS

International Search Report in PCT/EP2007/010618, Apr. 4, 2008.

* cited by examiner

PORTABLE DATA STORAGE MEDIUM FOR BIOMETRIC USER IDENTIFICATION

FIELD OF THE INVENTION

The present invention relates to a method for providing a reference model on a portable data carrier for biometrically recognizing a user of the data carrier on the basis of said reference model, and to such a data carrier.

Portable data carriers, such as for example chip cards, smart cards, mobile phone cards, secure multimedia cards and other portable devices provided with a computing capacity, are frequently used for security applications in which a user of the data carrier authenticates to an external entity. This is the case, for example, with access control or identification systems which collect biometric comparative data of the user and, for authenticating the user, compare them with biometric reference data which unquestionably come from the user. It is usual here to form a comparison vector which maps certain features of the biometric comparative data, and to compare it to a corresponding biometric reference vector which the user carries with him on the data carrier. The similarity criterion of the comparison operation here mostly has a certain tolerance to achieve recognition rates as good as possible.

BACKGROUND

In the case of a comparison with a static reference vector, however, no account is taken of a gradual change of the user's biometric property which may result e.g. from aging processes, physical and psychological conditions of the user, diseases and the like. Likewise, using one single reference vector cannot cover the normal complexity of a biometric feature space, since e.g. non-linear dependencies between feature vectors to be accepted and feature vectors to be rejected cannot be modeled.

So as to still achieve acceptable recognition rates despite these disadvantages, often context-dependent (i.e. user-dependent) knowledge about the concrete feature space is integrated into the comparison or recognition operation (the so-called classifier), which on the one hand can lead to better recognition rates, but on the other hand makes the classification computing-intensive and inflexible. For this reason, conventional recognition methods on a portable data carrier provided with only limited resources often cannot produce the recognition rates required by security applications, because they lead to an increased number of misclassifications at least after some time due to the mentioned limitation and inflexibility of the feature vector comparison.

In this context DE 10 2004 043 875 A1 discloses a possibility to compensate the natural changes of biometric features by taking them into account using adaptation values when evaluating biometric features, e.g. by normalizing them. This ultimately influences parameters of the feature recognition, for example the recognition-/admission tolerance of the recognition method or parameters of the feature sensors. In contrast, WO 02/071314 A1 proposes to take into account the natural changes of biometric features by using a recognized biometric comparison template under certain conditions as a reference template for the next comparison template to be recognized. Finally, WO 2006/069158 A2 discloses a self-adaptive method for a biometric recognition, whereby the biometric reference data used in each case are selected from various biometric modalities with different weightings in dependence on security requirements and the biometric data quality. In so doing, the reference data can be continuously adjusted in a predetermined fashion by the comparative data last checked in each case.

It is the object of the present invention to provide a flexible and efficient biometric recognition which reliably compensates the natural changes of biometric features.

SUMMARY

This object is achieved according to the invention by a method and a data carrier having the features of the independent claims. The claims dependent thereon describe advantageous embodiments and developments of the invention.

The invention is based on the idea that for verifying a comparison vector which was derived from current biometric data of a user of a portable data carrier, not only one or a small number of reference vectors are provided but an alterable and adjustable reference model which is formed from a multitude of reference vectors certainly coming from the user. In so doing, that range of a feature space within which a biometric comparison vector of the user is accepted as coming from the user is formed by an acceptance range of the reference model.

Said reference model of the user is located on a portable data carrier of the user and is defined by individual model nodes which each are formed from the biometric reference vectors coming from the user. The reference model is thereby gradually built up and extended by being supplemented and refined in each case by suitable new model nodes. A new model node is added to the reference model when the associated reference vector coming from the user, from which the new model node is derived, lies outside the acceptance range of the current reference model. For in this case it is necessary to effect a correction or adjustment of the present reference model, because the reference vector coming from the user should also be recognized as coming from the user on the basis of the reference model.

The method according to the invention is realized by a portable data carrier having a training module and a recognition module, which each can be designed as application programs executable by a processor of the data carrier, whereby the training module generates the reference model for the biometric recognition of a user of the data carrier by the recognition module and stores it in a memory of the portable data carrier. The recognition module then checks on the basis of the current reference model stored in the memory whether a biometric comparison vector lies within the current acceptance range and thus is to be accepted.

The reference model according to the invention permits in an arbitrarily fine manner an exact determination of that range of the feature space which represents exactly those comparison vectors which actually come from the user or might potentially come from him. By adding new model nodes in a certain local range of the feature space, the reference model is adjusted to the user's gradually changing biometric properties. By this reference model being refinable at any time by means of further model nodes, the recognition rate can be maintained or even permanently improved despite temporal changes in the underlying biometric data. The reference model according to the invention thus provides a learning classifier for a long-term reliable biometric user recognition. In addition, the training method according to the invention and the reference model itself are especially suitable for being implemented or used on a portable data carrier.

Through the successive addition of new model nodes, the reference model is defined piecewise in the feature space by local models, which each are formed of at least one model node. Defining individual local models permits a simple and efficient way of defining the total reference model, since each local model can be defined in a sufficiently precise manner by a small number of parameters. These generic parameters can be alterably stored by the training module in an efficient data structure in a memory of the data carrier, the memory also being accessible by the recognition module.

Each local model is provided with a validity range which in each case indicates which local model is to be used by a recognition module for recognizing a certain biometric comparison vector. Besides the validity range the training module assigns to each local model a tolerance range, the tolerance ranges of all local models constituting the acceptance range of the reference model. The (geometric) parameters of a local model with its validity range and tolerance range can be stored as n-dimensional points in the n-dimensional feature space or by interpolations between said points in the memory of the data carrier.

The recognition module, which carries out a biometric recognition on the basis of such a reference model, accepts a biometric comparison vector received via the communication interface of the data carrier as coming from the user when the comparison vector lies within the tolerance range of that local model within whose validity range the comparison vector falls. For determining a validity range of a local model the training module forms for each model node a probability distribution, whose width is in each case dependent on the position and width of the probability distributions of neighboring model nodes. A probability distribution of a model node is narrow when there exist many other model nodes in its neighborhood, and is accordingly wide when there are no or few other model nodes in its neighborhood. The validity range of a local model is the total range of the probability distributions of all model nodes which form the local model in question.

On the basis of the probability distributions the recognition module ascertains a recognition quality, i.e. the probability with which the recognition result is correct. Since a probability distribution has high probability values at and in the proximity of the associated model node, and assumes smaller probability values with increasing distance from the model node in question, the recognition module assigns to an accepted comparison vector a high recognition quality when it lies as close as possible to a model node. The probability distribution can be a normal distribution at least qualitatively.

BRIEF DESCRIPTION OF THE DRAWINGS

Upon addition of a new model node, its probability distribution and the probability distributions of the neighboring model nodes are adjusted in their width and coordinated to each other. This may result in a change of the validity ranges of the local models in question. If the number of model nodes which form a local model exceeds a predetermined maximum number stored in the memory of the data carrier, the training module may refrain from adding further model nodes to the local model in question, because the local model is already defined sufficiently finely and no appreciable improvement of the recognition rate is to be expected. Alternatively or additionally, such a local model can be split up by the training module into two new local models, so as to achieve a better adaptability of the reference model to the local conditions in the feature space.

The training module can calculate the model nodes in different ways from the associated biometric comparison vectors, but, preferably, the associated biometric reference vector of the user himself is used as a model node to be newly introduced. All information relating to the reference model is stored by the training module in a memory of the data carrier, preferably in an efficient data structure which takes into account the structure of a reference model consisting of local models.

In principle, the method according to the invention can be used both for building a reference model in a separate training phase, in which the reference model is initially generated on the basis of a multitude of reference vectors which are provided by an authorized body as such. On the other hand it is also possible that the training module, during an application phase, adjusts an existing reference model already used by the recognition module, if an authorized body provides biometric reference vectors. The authorized body can be e.g. a public authority or the like, which provides reference vectors to the training module via a terminal to which the portable data carrier is connected.

If the training module is to refine the present reference model with a new reference vector due to a corresponding signal from an external terminal, the recognition module is first instructed to ascertain whether the corresponding reference vector is not already accepted as coming from the user on the basis of the present reference model. If the reference vector is falsely rejected, however, the recognition module forwards this information to the training module, whereby the terminal of the authorized body at the same time transmits a signal to the training module according to which said vector is a reference vector coming from the user. Thereupon, the training module adds the biometric comparison vector to the existing reference model in the form of a new model node or even as a new local model.

The method according to the invention is preferably realized on a portable data carrier, such as for example a chip card, smart card and the like, which is personalized for a user. Thus, a portable data carrier according to the invention serves as an individual and unambiguous identification card of the user, his biometric identity being stored on the identification card in the form of the adaptive reference model, if possible in a specially protected memory or memory area.

Figure 1:
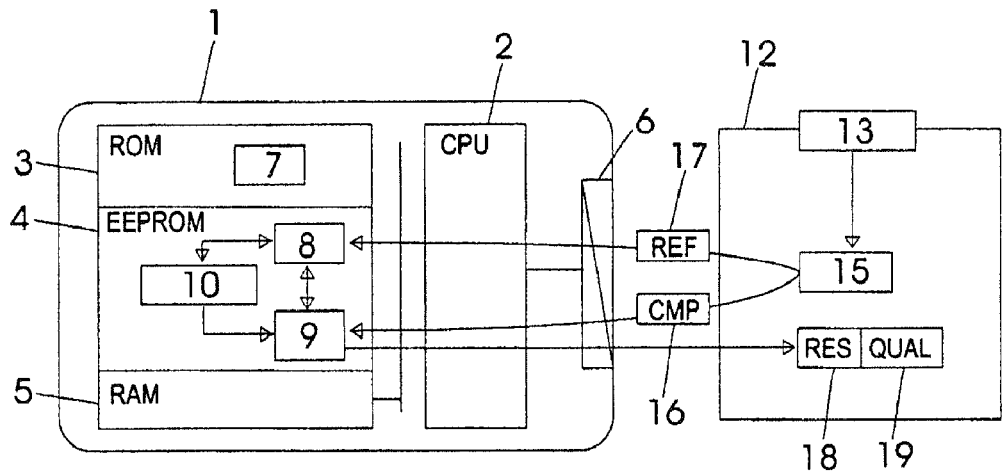
Figure 2:
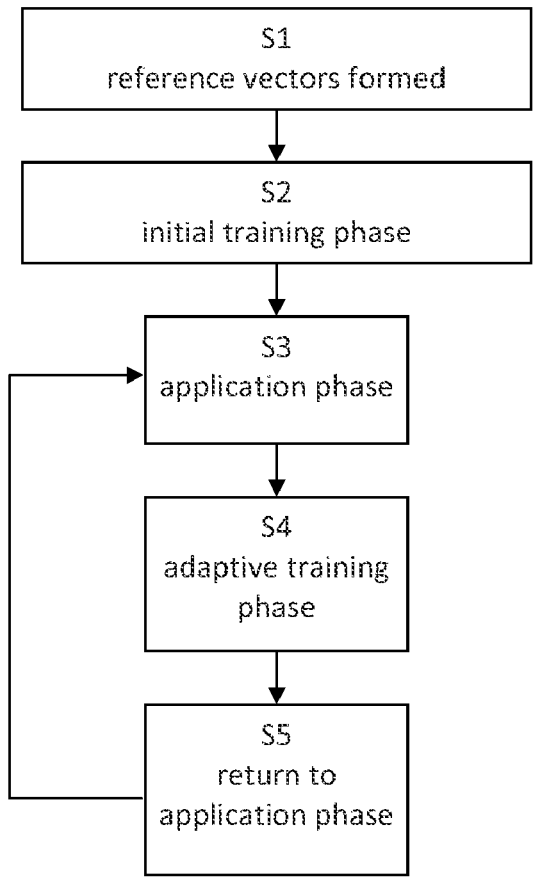
Figure 3:
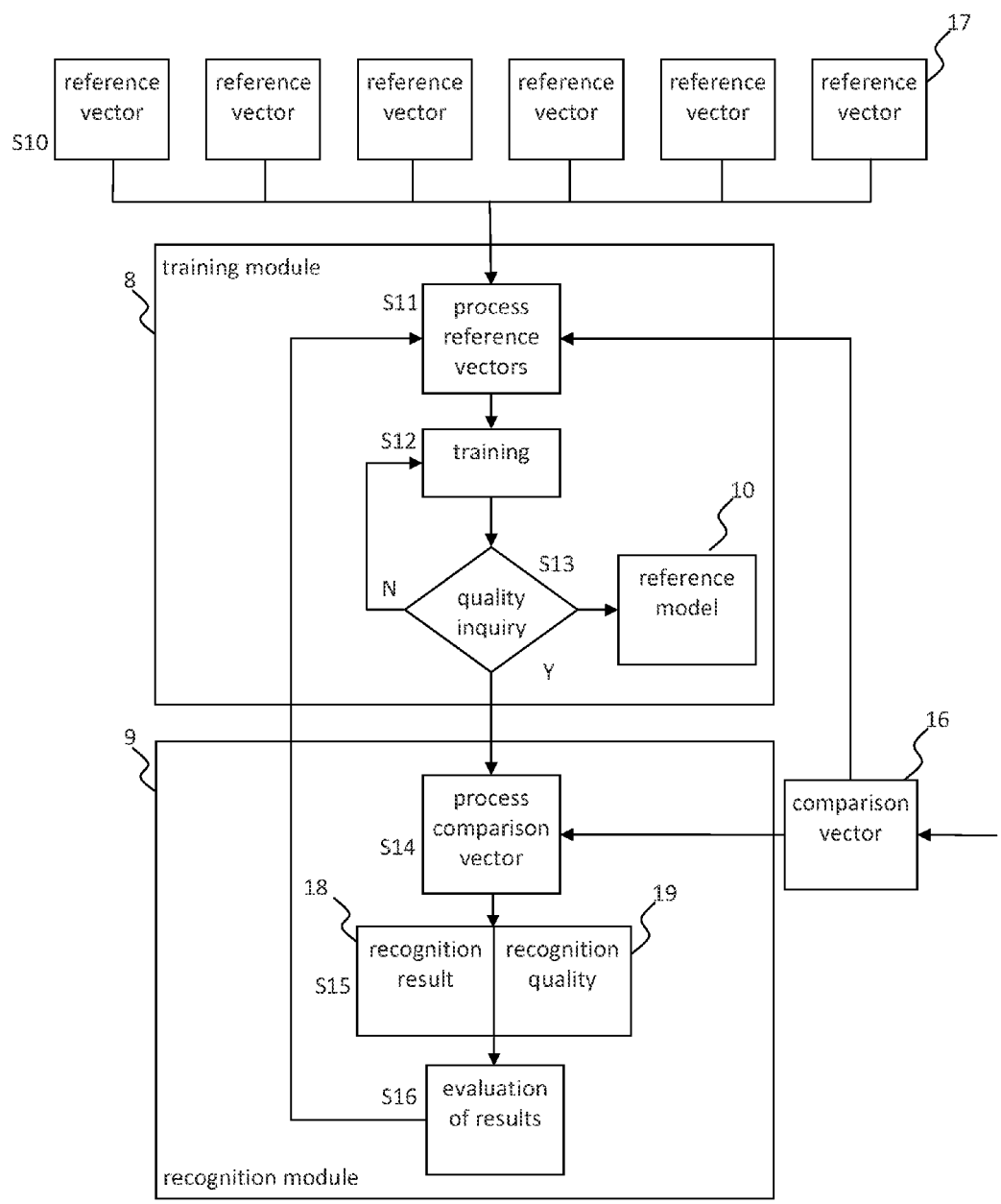
Figure 4A:
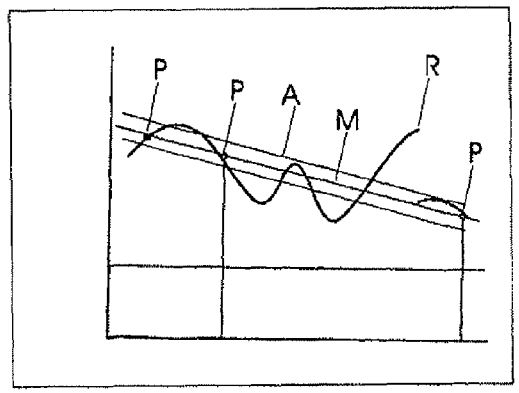
Figure 4B:
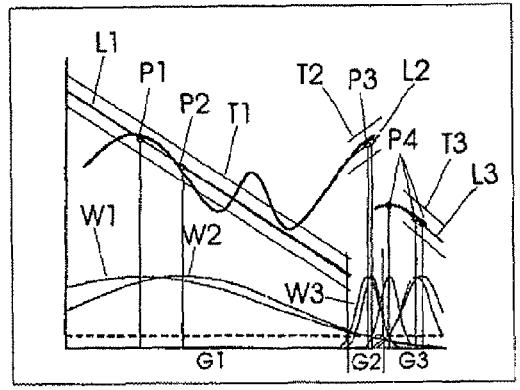
Figure 4C:
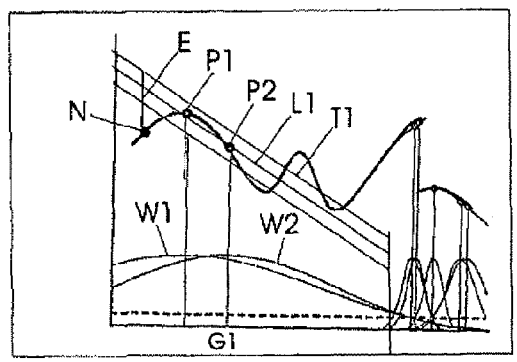
Figure 4D:
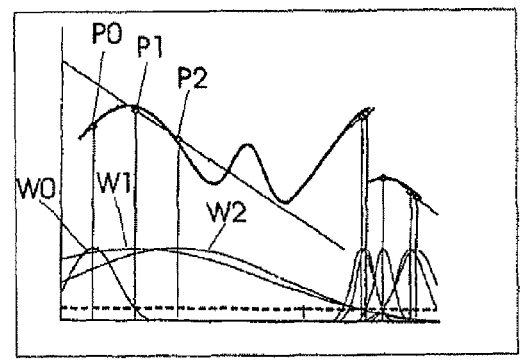
Figure 4E:
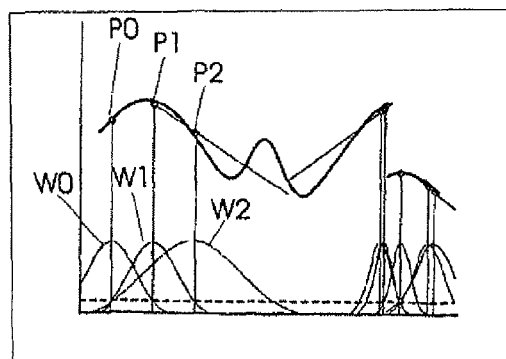
Figure 4F:
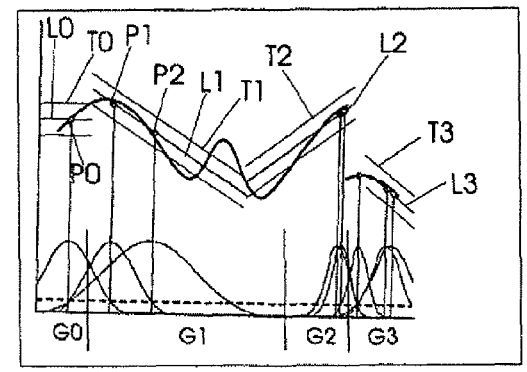
Figure 5:
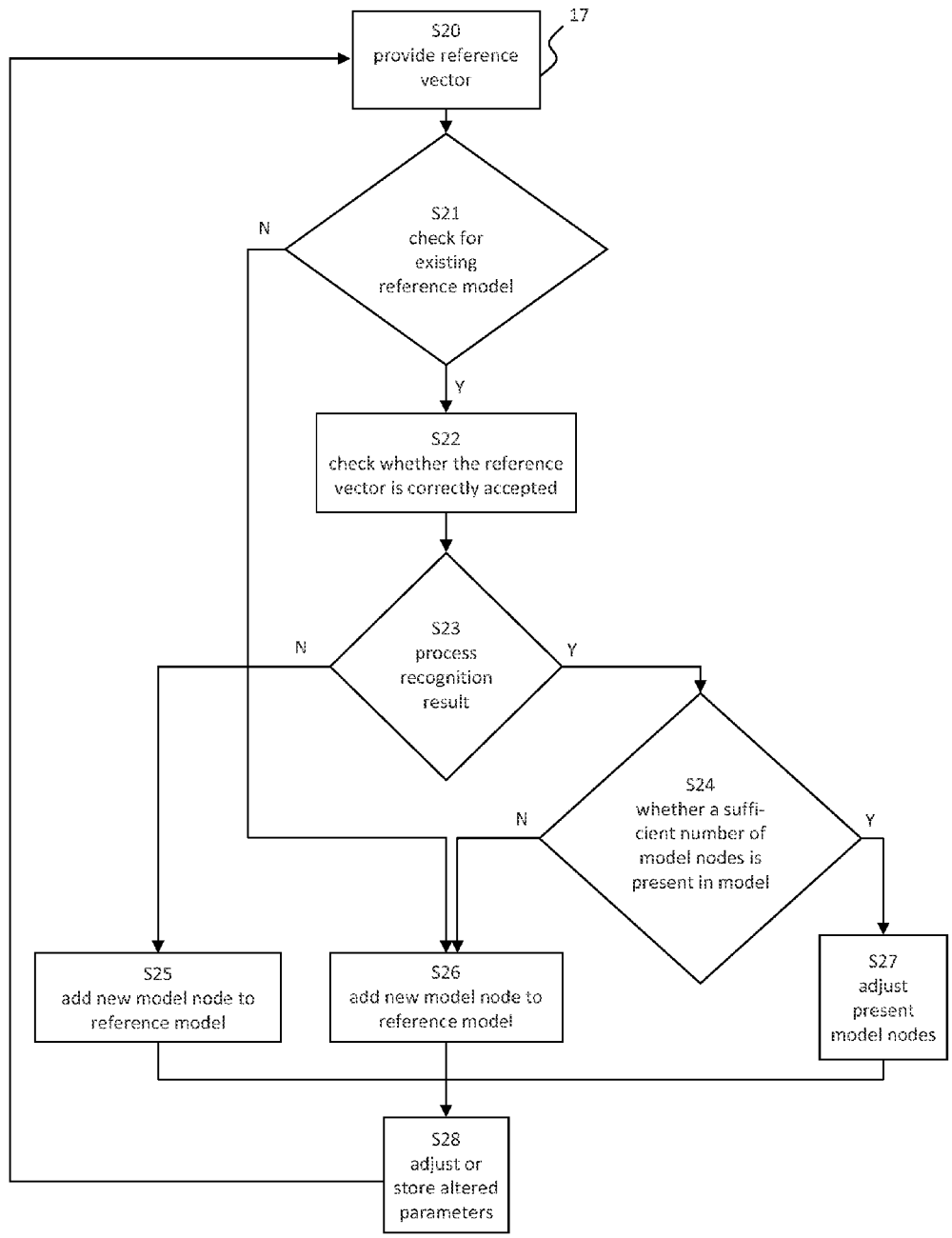

Further features of the invention will appear from the following description of various embodiments and alternatives according to the invention. Reference is made to the following Figures:

FIG. 1 shows a portable data carrier according to the invention;

FIG. 2 shows a schematic sequence of a training and recognition process;

FIG. 3 shows a schematic representation of an adaptive training process of the training module during an application phase of the recognition module;

FIG. 4 shows an illustration of a piecewise definition of a reference model by local models by means of the training module; and FIG. 5 shows a schematic representation of a training phase.

DETAILED DESCRIPTION OF PREFERRED EMBODIMENT

FIG. 1 shows a portable data carrier, for example a chip card 1 or smart card personalized for a certain user, which via communication interface 6 is in contact with an external device, for example with the biometric terminal 12 of an access control station. Chip card 1 is provided with the usual components, in particular with a processor 2 (CPU) and a memory array consisting of a permanent ROM memory 3, a re-writable EEPROM memory 4, and a volatile RAM main memory 5. In EEPROM memory 4 there are stored the data and structures of a biometric reference model 10 of the user of chip card 1, which represent the biometric identity of the user of chip card 1. Besides a chip card operating system 7 there are stored on the chip card further system and application programs and data, in particular a training module 8 and a recognition module 9 which can be application programs executable by processor 2.

When used, chip card 1 is in contact with an external terminal 12 which typically is provided with a biometric sensor 13 that records certain biometric properties of the user of chip card 1, for example finger prints, iris pattern, voice, face or the like. The recorded biometric raw data are transformed by a biometric unit 15 into a biometric feature vector, which is transmitted to chip card 1 as a biometric comparison vector (CMP) 16 or a biometric reference vector (REF) 17.

When the user of chip card 1 in the case of application wants to authenticate to terminal 12, which for example can be part of an access control system or border control system, a biometric comparison vector 16 of the person in question is generated via sensor 13 and biometric unit 15, received via communication interface 6 by chip card 1, and compared with reference model 10 by recognition module 9. If biometric comparison vector 16 corresponds to reference model 10, it is proved that the person is the legitimate user of chip card 1 and thus has successfully authenticated himself. Finally, chip card 1 transmits a result signal to terminal 12, which comprises a recognition result 18 (RES) and an associated recognition quality 19 (QUAL) as a reliability or confidence measure. Recognition result 18 here represents an indication of whether the person was recognized or not recognized as the user of chip card 1. The recognition quality 19 of the recognition result 18 is stated, for example, in the form of a probability of the recognition result 18 actually being correct.

In a training phase, reference model 10 is generated by training module 8 on the basis of biometric reference vectors 17 which training module 8 receives from terminal 12. The biometric reference data 17 are those biometric feature vectors which definitely come from the user in question whose reference model 10 is to be generated. Biometric reference data 17 differ from conventional biometric comparative data 16 in that terminal 12 or another authorized body has separately checked that said reference data actually are biometric feature vectors of the user, e.g. by an additional ID card check or the like. Likewise, training module 8 can update and adjust the reference model 10 during an application phase or recognition phase of the recognition module 9, for example when an authorized body provides further biometric reference data 17 of the user. This mechanism of adaptively adjusting the reference model 10 serves to adjust the reference model 10 to the user's biometric properties changing in the course of time which may be subject to time-variable influences, such as e.g. diseases, age, weather conditions, injuries or the like.

FIG. 2 shows the basic five-step sequence of a training and recognition process carried out by chip card 1: In step S1 biometric example patterns of the user of chip card 1 are recorded in the form of reference vectors 17 at a terminal 12 or are taken from a data base of an authorized body and transmitted to the training module 8 via its communication interface 6. Step S1 can be carried out e.g. when a personalized chip card 1 is issued to the user by a public authority or another authorized body, which acquires a sufficient number of finger prints, voice samples, iris images or the like and provides them to chip card 1 for initial training phase S2.

In step S2 training module 8 generates the initial reference model 10 within the framework of an initial training phase and stores it in the EEPROM memory 4 in a suitable data structure for use by recognition module 9. The following step S3 represents the application phase of the recognition module 9 in which the reference model 10 is used for the comparison with current biometric comparison vectors 16. Within the framework of, or separately after, application phase S3, training module 8 carries out an adaptive training phase S4 in which the existing reference model 10 is further refined and adjusted to changing properties of the user. In step S5, finally, the return to step S3 is effected so as to repeat application phase S3 and adaptive training phase S4.

However, adaptive training phase S4, which in principle can be carried out after each application phase S3, is only expedient when application phase S3 is carried out with a reference vector 17 coming from the user, since reference model 10 can only be refined with such a vector. This is the case, for example, when an authorized body can confirm that the person who at that moment is in possession of the portable data carrier 1 actually is the legitimate user of chip card 1, and accordingly the biometric feature vector currently ascertained by terminal 12 can be considered to be a biometric reference vector 17 of the user. The authorized body then can initiate adaptive training phase S4 from outside, e.g. by means of an appropriate signal transmitted to chip card 1.

In training phases S2 and S4 a biometric reference vector 17 is integrated into the present reference model 10 by training module 10 as a positive training data record, so that in the future biometric comparison vectors which are similar to said biometric reference vector 17 will be recognized by recognition module 9 as coming from the user due to the updated reference model 10. Besides the integration of positive training data, negative training data can also be integrated when they are known to an authorized body not to come from the user. Reference model 10 can either be tested with said negative comparison data, or training module 8 adjusts reference model 10 with said negative comparison data in such a way that comparison vectors 16 which are similar to the negative biometric reference data are rejected by recognition module 8 as not coming from the user.

Training phases S2 and S4 will be explained in more detail in the following with reference to FIGS. 3 to 5: FIG. 3 shows how training phases S2 and S4 and application phase S3 are interconnected. Within the framework of initial training phase S2 terminal 12 provides biometric reference vectors 17 to training module 8 in step S10. The latter are loaded by training module 8 via communication interface 6 into a memory 4, 5 of the data carrier 1, and processed there in step S11 in the form in which reference vectors 17 are required by training module 8. The processing within the framework of step S11 can comprise, for example, data conversions, weightings of individual vector components, normalizations and the like.

In the loop S12, S13 reference model 10 is built up step by step by forming from the biometric reference vectors 17 model nodes of the reference model 10 which form e.g. nodes of an interpolation. Training step S12 is carried out until it is determined in step S13 that the reference model 10 has achieved a certain degree of quality. Inquiry step S13 ensures that a reference model 10 does not pass to application phase S3 (FIG. 2) until a sufficiently high recognition rate can be achieved. In principle, in step S13 there can be used any desired quality criterion, for example the number or density of model nodes in the reference model 10 or a minimum recognition rate in a test with positive and negative example vectors.

In application step S14 a biometric comparison vector 16 is processed by recognition module 9. Recognition module 9 checks whether comparison vector 16 corresponds to present reference model 10. If this is the case, there is generated in step S15 as a recognition result 18 a signal according to which the person whose biometric comparison vector 16 was checked is an authenticated user of chip card 1. Otherwise, when recognition module 9 recognizes in step S14 that comparison vector 16 does not correspond to reference model 10, the authentication of the person in question is refused. With the recognition result 18 there can additionally be generated a recognition quality 19 which indicates the reliability of the recognition result 18, for example in the form of a probability value.

In step S16 there is finally effected an evaluation of the results 18, 19, whereby it can be checked, for example, whether the reference model is to be updated with biometric comparison vector 16 within the framework of an adaptive training phase S4. This is expedient, for example, when it is absolutely certain due to a corresponding signal from terminal 12 that biometric comparison vector 16 actually is a reference vector coming from the user which was falsely rejected by recognition module 9 as not coming from the user. In this case reference model 10 is updated with this reference vector by a return to step S11. Likewise, in step S16 it can be decided to integrate a reference vector correctly accepted as coming from the user into the reference model 10 when e.g. the density of the model nodes in the corresponding local range of the reference model 10 is low.

The training phase S2, S4 itself (FIG. 2) that is carried out by training module 8 is explained step by step in FIG. 5, while FIG. 4 shows an illustrative example of a definition of an adaptive reference model M by a plurality of local models L0, L1, L2, L3 on the basis of corresponding model nodes P.

The curve R in FIG. 4A symbolizes the location and shape of an ideal reference model with which all feature vectors of the user in question could be correctly classified and all feature vectors not coming from the user could be correctly rejected. The goal of the training phases S2 and S4 is to approximate said biometric properties of the user R as precisely as possible by a reference model M. In the diagrams of the FIGS. 4a to 4f the abscissa (x-axis) qualitatively represents in each case the input values of the reference model M, i.e. the biometric features captured in each case, while the ordinate (y-axis) qualitatively indicates the corresponding output values, i.e. the measured values actually ascertained in dependence on the corresponding sensor 13 and other properties and conditions of the terminal 12 and of the user. In the space spanned by these two axes the reference model M can be illustrated as a piecewise defined curve, whereby the diagrams at first do not indicate any concrete recognition result (classification statement). The latter does not result until an acceptance range A of the reference model M is specified, which determines those feature vectors which according to the model are accepted as coming from the user.

FIG. 4a shows that the ideal model R is approximated by a reference model M on the basis of nodes P which are derived from reference vectors 17 provided within the framework of step S1 of FIG. 2. The particular current reference model M results from a basically arbitrary interpolation from the existing nodes P, whereby a linear interpolation will be assumed in the following for simplicity's sake. However, any other interpolation is also possible, e.g. a spline or cubic interpolation. The acceptance range A of the reference model M is specified as a neighborhood of the straight line of the reference model M, whereby all biometric comparison vectors lying within the acceptance range A are accepted according to the model as coming from the user.

Starting out from the situation with three nodes P shown in FIG. 4a, FIG. 4b represents a later point in time of the training process with a multitude of nodes P1, P2, P3, P4 which altogether form three local models L1, L2, L3 which piecewise define the reference model M as straight line segments. Each local model L has a tolerance range T, whereby the tolerance ranges T of all local models L result in the acceptance range A of the total reference model M.

Each model node P has associated therewith a probability distribution W, which defines on the one hand a recognition quality 19 and on the other hand a validity range G of the corresponding local model L. The validity range G1 of the local model L1 is defined for example as that range of the abscissa which is covered by the probability distributions W1 and W2 of the nodes P1 and P2 of the local model L1. The boundary between the validity range G1 and the validity range G2 of the local model L2 is where the probability distribution W2 of the node P2 intersects the probability distribution W3 of the node P3 of the local model L2. The validity range G3 of the local model L3 is in turn determined by the probability distributions of the nodes P4.

Upon classification of a comparison vector 17 by recognition module 9 it is first ascertained in which validity range G the comparison vector 17 lies, so as to then check whether the comparison vector 17 conforms to the model with respect to the corresponding local model L. If this is the case, a recognition quality 19 can be stated on the basis of the corresponding probability distribution W. The higher this probability value, the more probably the recognition result 18 is correct with respect to the corresponding biometric comparison vector 17. This means that a correct classification of a comparison vector 17 is the more probable, the closer this comparison vector 17 lies to a model node P in the corresponding local model L.

FIG. 4c shows a reference vector N, which lies within the validity range G1 of model L1. Although reference vector N lies exactly on the ideal curve R—i.e. certainly comes from the user—it does not lie within the tolerance range T1 of the local model L1 and thus is falsely rejected. The distance between the point N and the straight line which represents the local model L1 determines the recognition error E. In a training phase S2 or S4 (FIG. 2), the present reference model M is then updated with the new reference vector N by a corresponding node P0 with a probability distribution W0 being added (FIG. 4d) the width of which is adjusted to that of the neighboring probability distributions W1 and W2 of the nodes P1 and P2. The widths of the neighboring probability distributions W1 and W2 also have to be adjusted, so as to obtain reasonable validity ranges oriented to the position of the nodes P0, P1 and P2 (FIG. 4e).

FIG. 4f finally shows that node P0 is not used for defining the local model L1 more finely, but that therefrom a new local model L0 is formed because e.g. the local model L1 has exceeded the permissible maximum number of nodes per local model, or another criterion is fulfilled. The reference model M is now formed from four local models L0, L1, L2 and L3 with individual validity ranges G0, G1, G2 and G3. The acceptance range A of the reference model M is composed piecewise of four tolerance ranges T1, T2, T3 and T4.

Besides the above-described introduction of model nodes N on the basis of a reference vector 17 certainly coming from the user of the data carrier, is it also possible to add negative model nodes P to the reference model M which represent those feature vectors certainly not coming from the user in question. A negative model node then can form, for example, a local rejection model with a corresponding rejection range, whereby a biometric comparison vector 16 to be classified which lies within the rejection range is rejected by the recognition module 9 as not coming from the user.

FIG. 5 once again illustrates the steps of the training phase S2, S4 on the basis of the model definition shown in FIG. 4. In step S20 training module 8 is first provided with a reference vector N coming from the user. In step S2 1it is checked whether there already exists a reference model M, i.e. whether model nodes P are present at all. If this is not the case, in step S26 reference vector N is added to the reference model M as a model node P0 without any further check, and a local model L0 with a tolerance range T0 is formed on the basis thereof. If in step S21 it is determined that there already exist model nodes P, it is checked in step S22 whether the reference vector N according to the present reference model M is correctly accepted as coming from the user or is falsely rejected. If in step S23 this recognition result 18 turns out to be false (i.e. reference vector N was rejected as not coming from the user; of FIG. 4c), in step S25 a new model node P0 is added to the reference model M on the basis of the reference vector N so as to avoid such a false classification in the future.

If in step S23 recognition result 18 turns out to be correct (i.e. reference vector N was accepted), there is at first no necessary reason to add a corresponding model node P0 to reference model M. In step S24 it is nevertheless checked whether a sufficient number of model nodes P is already present in reference model M or local model L in question. If this is not the case, in step S26 a new model node P0 is still added to reference model M on the basis of reference vector N, so as to increase the local density of model nodes P in reference model M (or the local model L in question) and to thus achieve a local definition of the reference model M as fine as possible. If in step S24 it is determined that the reference model M is already defined by a sufficient number of model nodes P, the present model nodes can be adjusted in step S27, e.g. by shifting or moving them in the direction of the reference vector in the reference model M to obtain a model node density as homogenous as possible, or by splitting a local model L into two new local models (cf FIG. 4f). Upon each alteration of the reference model M, in step S28 the altered parameters are adjusted or stored in a suitable data structure. This in particular relates to the probability distributions W, validity ranges G, and tolerance ranges T.

In the following, the mode of operation of the training module 8 and of the recognition module 9 will finally be explained by an example, with regard to the five steps S1 to S5 of FIG. 2. For this purpose, there are collected in step S1, for example, for a finger print recognition, not only positive reference vectors from a user of chip card 1 but also negative reference vectors from other persons which may be unpersonalized training examples. Ideally, the training examples are already stored in a data base without personal information, so that they can be randomly selected from the data base and used for training and verification purposes.

In the two training phases S2 and S4 (cf FIG. 2) a reference model M is generated with all positive and negative reference vectors. The above-described training method can be realized here in principle by any adaptive methods, in particular statistical methods, methods from the field of cognitive learning or artificial intelligence, learning classifiers and the like. In particular, it is possible to implement the iterative learning process of the steps S2 and S4 on the basis of neural networks. New neurons can be used here as a basis for the local models L. New neurons are therefore to be added to the reference model M whenever a certain local model M does not yet possess a sufficient number of model nodes P, or a negative reference vector is to be learned for delimitation from the feature vectors of the user, or the recognition quality 19 is so poor that an additional local model L has to be introduced for refining the total reference model M.

If, for example, linear models L are used in an n-dimensional feature space, n+1 neurons are required per model. For determining the recognition quality 19 each neuron gets an additional radial base function (corresponding to the tolerance range T in FIG. 4), the extent of which is determined by neurons of the respective other pattern class. When the recognition quality 19 is sufficiently high, only the active neuron is moved in the direction of a comparison vector 16 to be classified. In this way, an adequate reference model M can be generated even with comparatively small training data records. However, this method represents the class of the adaptive and learning methods only by way of example.

In application phase S3 a biometric comparison vector 16 is verified on the basis of the current reference model 10. Using the example of the above-described learning method, the relevant local model would be selected via the radial base function in combination with the corresponding active neuron. The recognition result 18 would then in the simplest case be the value of the local model L at the location of the comparison vector 16 and the recognition quality 19 would correspond to the activation of the radial base function of the active neuron.

The invention claimed is:

1. A method for providing a reference model having an acceptance range on a portable data carrier for biometrically recognizing a user of the data carrier, wherein a biometric comparison vector which lies within the acceptance range of the reference model is accepted as coming from the user, comprising the steps of:

defining, by a processor of the portable data carrier, the reference model by model nodes which are formed from biometric reference vectors in each case coming from the user, during an initial training phase, wherein for generating the reference model a multitude of biometric reference vectors is recorded, and wherein the reference model is defined piecewise by local models each having a validity range, and adding a model node to the reference model, during an application phase of the reference model upon checking, by the processor of the portable data carrier, a comparison vector when the comparison vector lies outside the acceptance range of the reference model and it is certain that the comparison vector actually comes from the user, wherein a local model is formed by at least one model node, and that for recognizing the user that local model of the reference model is used in whose validity range a biometric comparison vector of the user lies, wherein each local model is assigned in each case a validity range which is determined by a probability distribution which is assigned to the at least one model node forming the local model, wherein the width of the probability distribution of the model node results from the probability distributions of neighboring model nodes, and that the probability distribution assigned to a model node indicates a recognition quality of a biometric comparison vector accepted as coming from the user which lies within the validity range of that local model which is formed by at least the model node.

2. The method according to claim 1, wherein each local model is assigned in each case a tolerance range, the tolerance ranges of all local models forming the acceptance range of the reference model, and that a biometric comparison vector which lies in the tolerance range of a local model is accepted as coming from the user.

3. The method according to claim 1, wherein, upon addition of a model node to the reference model the widths of the probability distribution of the model node and of the probability distributions of neighboring model nodes are adjusted to each other.

4. The method according to claim 1, wherein when the number of model nodes forming a local model exceeds a predetermined maximum number, a further model node is not added to this local model and/or the local model is split into two new local models.

5. The method according to claim 1, wherein a decision about whether a biometric comparison vector is a biometric reference vector coming from the user is effected by an authorized body outside the data carrier.

6. A portable data carrier comprising a memory, a communication interface, a processor, and a recognition module and a training module each executable by the processor, wherein the training module is configured to provide in the memory a reference model having an acceptance range for the biometric recognition of a user of the data carrier by the recognition module, wherein a biometric comparison vector which lies within the acceptance range of the reference model is accepted by the recognition module as coming from the user; wherein the training module is configured to define the reference model by model nodes during an initial training phase,
wherein for generating the reference model a multitude of biometric reference vectors is recorded, which in each case are formed from biometric reference vectors received via the communication interface and coming from the user,
wherein the training module during an application phase of the reference model for checking a comparison vector adds a model node to the reference model when the comparison vector lies outside the acceptance range of the reference model and it is certain that the comparison vector actually comes from the user,
wherein the training module is configured to piecewise define the reference model by local models each having a validity range, to form a local model by at least one model node, and to store the local models in the memory,
wherein the recognition module is configured to use that local model of the reference model in whose validity range a biometric comparison vector of the user received via the communication interface lies,
wherein the training module is configured to assign to a local model a validity range which is determined by a probability distribution which is assigned to the at least one model node forming the local model, and to fix the width of the probability distribution of the model node in dependence on the probability distributions of neighboring model nodes, and
wherein the recognition module is configured to ascertain from the probability distribution assigned to a model node a recognition quality of a biometric comparison vector received via the communication interface and accepted as coming from the user which lies within the validity range of that local model which is formed by at least the model node.

7. The data carrier according to claim 6,
wherein the training module is configured to assign a tolerance range to each local model and to form the acceptance range of the reference model from the tolerance ranges of all local models, and
wherein the recognition module is configured to accept as coming from the user a biometric comparison vector, received via the communication interface, which lies within the tolerance range of a local model.

8. The data carrier according to claim 6, wherein the training module is set up such that upon addition of a model node to the reference model it adjusts to each other the widths of the probability distribution of the model node and of the probability distributions of neighboring model nodes.

9. The data carrier according to claim 6, wherein the training module is configured to not add a further model node to the local model and/or to split the local model into two new local models, and to store them in the memory, when the number of model nodes forming a local model exceeds a predetermined maximum number stored in the memory.

10. The data carrier according to claim 6, wherein the training module is configured to store in the memory, as a model node to be added to the reference model, the associated biometric reference vector of the user as a new model node.

11. The data carrier according to claim 6,
wherein the recognition module is configured to carry out a recognition of a biometric comparison vector by matching the comparison vector with a reference model of the user stored in the memory; and
wherein the training module is configured to generate the reference model within the framework of an initial training phase of the recognition module from a plurality of reference vectors received via the communication interface and to store it in the memory.

12. The data carrier according to claim 6,
wherein the recognition module is configured to carry out a recognition of a biometric comparison vector by matching the comparison vector with an adaptive reference model of the user stored in the memory; and
wherein the training module is configured to continuously adjust the reference model within the framework of an application phase of the recognition module with biometric reference vectors received via the communication interface and to store it in the memory.

13. The data carrier according to claim 6, wherein the training module is configured such that upon addition of a model node to the reference model it gets information from the recognition module that the associated reference vector lies outside the acceptance range of the reference model, and receives information from an authorized body via the communication interface that the associated reference vector comes from the user.

14. The data carrier according to claim 6, wherein the data carrier is a chip card personalized for the user.

* * * * *